United States Patent
Carballo Rodriguez

(10) Patent No.: US 10,828,990 B2
(45) Date of Patent: Nov. 10, 2020

(54) AUTONOMOUS RETARDER SYSTEM FOR A VEHICLE, AND VEHICLE INCLUDING SAME

(71) Applicant: RALENTIZADORES Y TRANSFORMACIONES, S.A., Madrid (ES)

(72) Inventor: Pablo Carballo Rodriguez, Madrid (ES)

(73) Assignee: RALENTIZADORES Y TRANSFORMACIONES, S.A., Madrid (ES)

( * ) Notice: Subject to any disclaimer, the term of this patent is extended or adjusted under 35 U.S.C. 154(b) by 0 days.

(21) Appl. No.: 15/503,597

(22) PCT Filed: Aug. 14, 2014

(86) PCT No.: PCT/ES2014/070655
§ 371 (c)(1),
(2) Date: Feb. 13, 2017

(87) PCT Pub. No.: WO2016/024030
PCT Pub. Date: Feb. 18, 2016

(65) Prior Publication Data
US 2017/0232850 A1    Aug. 17, 2017

(51) Int. Cl.
*B60L 7/28* (2006.01)
*H02K 7/18* (2006.01)
(Continued)

(52) U.S. Cl.
CPC ............... *B60L 7/28* (2013.01); *B60L 1/003* (2013.01); *B60L 7/26* (2013.01); *B60T 8/1705* (2013.01);
(Continued)

(58) Field of Classification Search
CPC ......... B60L 7/28; B61H 11/04; B60T 8/1705; B60T 13/748; F16D 65/78; F16D 63/002; F16D 2065/788; F16D 2121/20
See application file for complete search history.

(56) References Cited

U.S. PATENT DOCUMENTS 2,640,941 A    6/1953  Winther
6,543,588 B1 *  4/2003  Raad .................. B60L 7/00
                                                180/65.22
(Continued)

FOREIGN PATENT DOCUMENTS

DE    3908234 A1    8/1990
DE    4026251 A1    6/1991
ES    2245975 T3    2/2006

OTHER PUBLICATIONS

International Search Report dated Apr. 7, 2015 for PCT/ES2014/070655.

*Primary Examiner* — Xuan Lan Nguyen
(74) *Attorney, Agent, or Firm* — Lucas & Mercanti, LLP

(57) ABSTRACT

The invention relates to an autonomous retarder system for a vehicle including a retarder (10) having a central rotor (11) and two stators (12), one on each side of the rotor (11). The rotor (11) is rigidly coupled to an axle (1). A generator (20, 30, 50) is also included, coupled to the retarder (10), for supplying same with electrical energy. In addition, the generator (20, 30, 50) comprises a stator (22) and a rotor (21, 31, 51) coupled to the retarder.

10 Claims, 11 Drawing Sheets

(51) Int. Cl.
  *H02K 49/04* (2006.01)
  *B60L 1/00* (2006.01)
  *B60L 7/26* (2006.01)
  *B60T 8/17* (2006.01)
  *B60T 13/74* (2006.01)
  *B61H 11/04* (2006.01)
  *F16D 63/00* (2006.01)
  *F16D 65/78* (2006.01)
  *F16D 121/20* (2012.01)

(52) U.S. Cl.
  CPC ............ *B60T 13/748* (2013.01); *B61H 11/04* (2013.01); *F16D 63/002* (2013.01); *F16D 65/78* (2013.01); *H02K 7/1807* (2013.01); *H02K 7/1846* (2013.01); *H02K 49/046* (2013.01); *B60L 2200/26* (2013.01); *B60L 2220/12* (2013.01); *B60L 2220/14* (2013.01); *B60L 2220/42* (2013.01); *B60L 2240/421* (2013.01); *F16D 2065/788* (2013.01); *F16D 2121/20* (2013.01); *Y02T 10/64* (2013.01)

(56) References Cited

U.S. PATENT DOCUMENTS

| | | | |
|---|---|---|---|
| 7,178,644 B2 * | 2/2007 | Kloft | H02K 49/046 188/161 |
| 2008/0258693 A1 | 10/2008 | Dessirier et al. | |
| 2013/0234542 A1 | 9/2013 | Li et al. | |

* cited by examiner

AUTONOMOUS RETARDER SYSTEM FOR A VEHICLE, AND VEHICLE INCLUDING SAME

CROSS REFERENCE TO RELATED APPLICATION

This Application is a 371 of PCT/ES2014/070655 filed on Aug. 14, 2014, which is incorporated herein by reference.

TECHNICAL FIELD OF THE INVENTION

The invention belongs to the field of braking systems for vehicles, and specifically for trains. More specifically, it corresponds to electromagnetic braking systems that use the principle of Foucault currents.

BACKGROUND OF THE INVENTION OR STATE OF THE ART

The majority of braking systems are based on mechanical friction to reduce speed. This type of brake presents problems of wear and the need for constant and periodic maintenance. Also, the noise level of these systems decreases passenger comfort.

For this and other reasons, efforts have been made to apply other principles for braking. Specifically, auxiliary brakes that serve as a support to friction-based brakes have been designed. One notable option consists of electrical brakes that are activated based on the induction of Foucault currents (also known as Eddy currents) in the rotor. These are called retarders, and they are made up essentially of a stator equipped with windings and two rotors rigidly coupled to an axle (whose rotation is generally provided by a cardan transmission). When these are excited by means of currents on the induction coils, it creates a magnetic field whose lines of force pass through the rotors, creating induced currents, which in turn generate a moment in the direction opposite the rotation which opposes the movement. As a result, the rotational speed, and with it, the speed of the vehicle, are progressively reduced. The rotor and stator surfaces do not need to be in contact for this effect to be produced. These brakes generate smooth, silent braking, with no wear, and their effectiveness increases the higher the speed. For this reason, retarders are combined with conventional friction brakes to bring the vehicle to a complete stop.

At present, retarders require an electrical energy supply to feed current to the stator windings. The power supplies of known retarder systems are external, provided by batteries. The requirements for these batteries are quite demanding because a large amount of current (approximately 160 A) is required. While these requirements can be fulfilled using the existing technology, these batteries are generally large and costly. On the other hand, if a battery is shared with other devices on the vehicle, the energy stored may be insufficient. Another choice for ensuring the power supply to the retarder is to equip it with its own battery. Regardless of which option is applied, the power supply generally cannot be integrated into the retarder, and the retarder is not compact.

BRIEF DESCRIPTION OF THE INVENTION

The object of the invention is a retarder system for a vehicle that resolves or at least mitigates the problems and limitations observed in the prior art.

Another object of the invention is a vehicle that is equipped with the retarder system.

The retarder system is a compact and energetically autonomous unit. It is equipped with its own integrated generator. This generator shares the axle with the retarder to which it is rigidly affixed, such that it takes advantage of the movement of the axle and/or principal rotor of the retarder to move an additional rotor for the generator and thus produce the necessary current. With this configuration, the generator can be sized with an adequate diameter to supply the necessary energy to the retarder, making it independent from the other elements. The transformation of mechanical energy into electrical energy is done without the need for additional transmission elements, such as chains, pulleys, etc.

The autonomous retarder system for a vehicle in accordance with the invention comprises a retarder with a central rotor and two stators on each side of the rotor, with the rotor in question rigidly coupled to an axle. It also comprises a generator coupled to the retarder to supply it with electrical energy. The generator includes its own stator and rotor that is coupled to the retarder.

Optionally, the generator stator may be located externally and rigidly coupled to the retarder stator by means of the same axle.

Optionally, the generator may be self-excited, use permanent magnets, or have external excitation (which uses soft materials on a fixed core).

Optionally, the permanent-magnet generator is responsible for providing excitation to the external-excitation generator.

Optionally, the permanent-magnet generator and self-excited generator work together so that the permanent-magnet generator supplies electrical energy to the retarder when the axle rotation speed is below an initial threshold and the self-excited magnet generator supplies electrical energy to the retarder when the axle rotation speed is higher than a second threshold.

Optionally, the central rotor may be self-ventilating.

Optionally, the central rotor of the retarder comprises two lateral disks and a plurality of spaced ribs connecting said disks.

Optionally, the system includes a braking regulation module to control the excitation current of the generator according to a control signal.

Optionally, the regulator module includes a rectifier and a voltage stabilizer.

Optionally, the system includes a temperature sensor to measure the temperature of the retarder and report it to the regulator module to reduce the current from the generator when this temperature exceeds a threshold.

DETAILED DESCRIPTION OF THE INVENTION

The figures describe several examples of embodiments but do not limit the invention.

Note that the selected configuration is not the customary configuration with two external rotors and an intermediate stator. The axial arrangement of one rotor and two stators is proposed as an alternative in the embodiments described here. The retarder rotor is positioned centrally, with the stators positioned on either side of it. This configuration mitigates problems of rotor locking caused mainly by exposure to weather. In cold climates, blocks of ice may form on the rotors, which could damage nearby elements if they are thrown off during rotation.

There are other advantages to selecting a central rotor. One is that it provides fixed air gaps. Another is that it can function regardless of the direction of rotation. The direction of rotation is especially important for cooling. With external rotors, when they rotate in one direction, air is forced into the retarder to cool it. Cooling problems may result if the direction of rotation is reversed. On another note, compared with the case of two rotors, the axial forces are neutralized when there is only a single rotor. These forces can cause warping of the retarder rotors.

Figure 1:
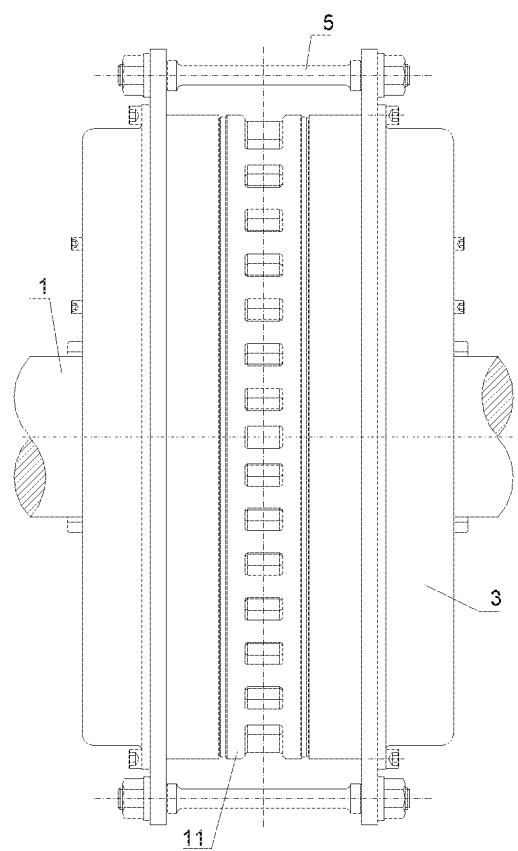
FIG. 1: Exterior view of a retarder system with its housing, mounted on an axle.

FIG. 1 shows the external appearance of one embodiment of the retarder system. The retarder system is compact despite being equipped with a generator 20, 30, because the generator is integrated into the assembly. This makes it possible to house all of the components that are protected externally by a series of housings 3 on each side of the axle 1 on which it is mounted. This axle 1 may be an axle with a direct connection to the wheels, or may be a cardan shaft. Generally, the assembly is mounted on the axle 1 by means of a bushing 2.

Figure 2:
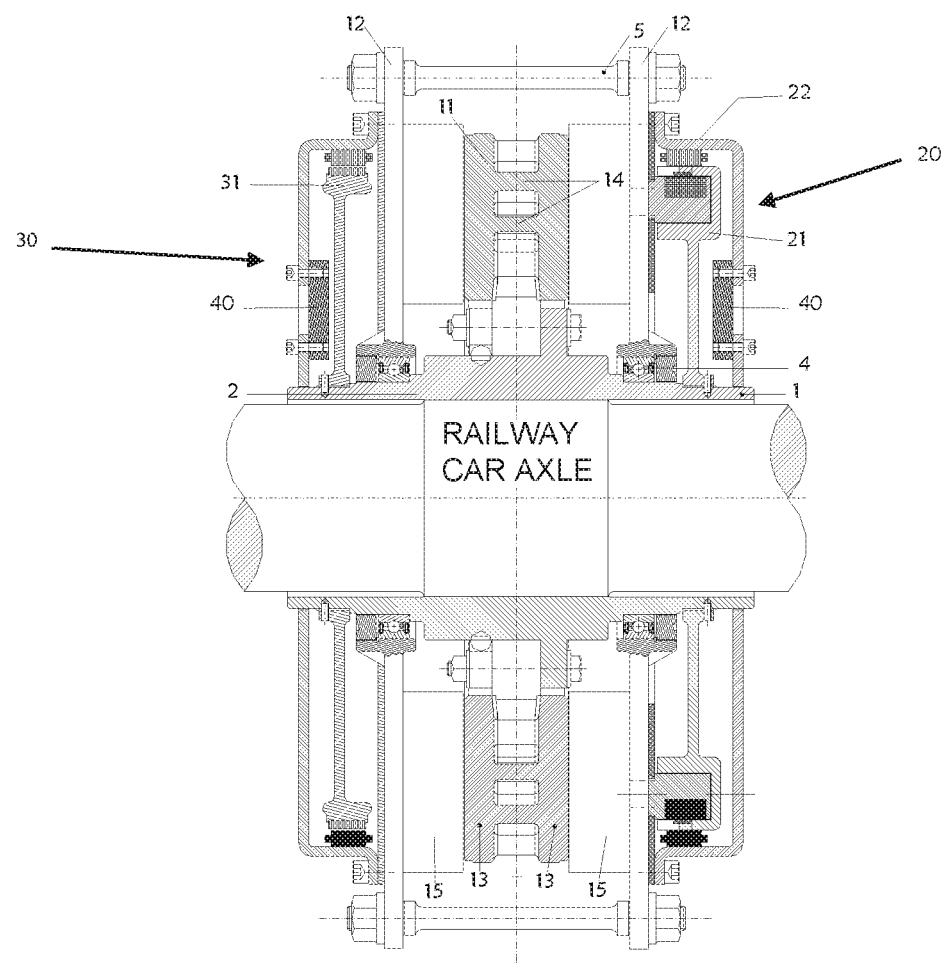
FIG. 2: Interior view of a retarder system with two types of generators.

FIG. 2 shows the complete interior of the aforementioned retarder system. For the sake of convenience, the embodiment of the system includes two different electrical generators on each side. Nevertheless, both generators may also be the same. Depending on the application, a single generator may even suffice to provide power to the retarder system. In turn, this single generator may be a permanent-magnet generator 30, or a self-excited generator 20, depending on the needs. For example, to reduce weight, a permanent-magnet generator would be preferable. On the other hand, if high braking torque is needed, a self-excited generator would be preferred.

Figure 3:
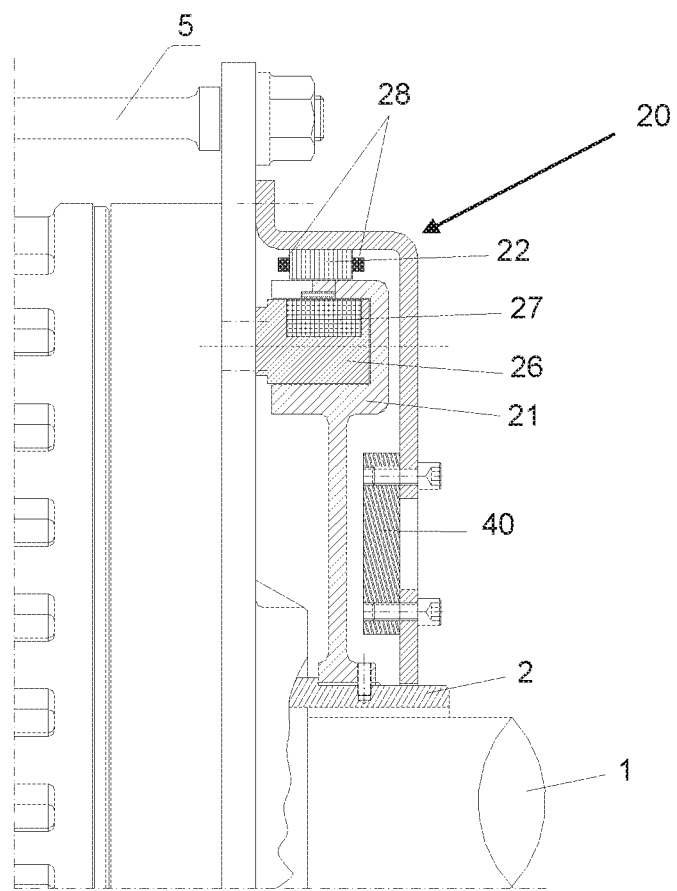
FIG. 3: Detailed view of the self-excited generator.
Figure 4:
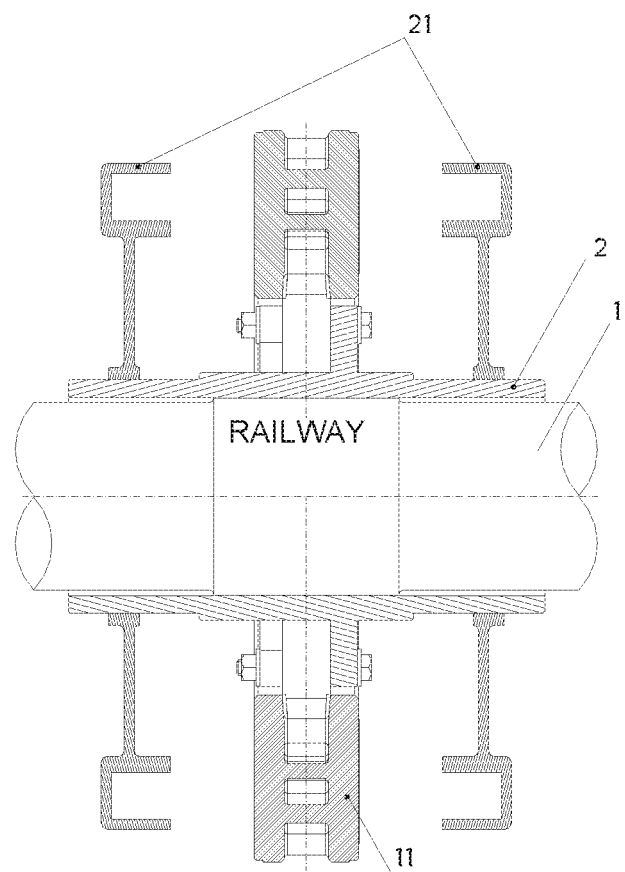
FIG. 4: Moving parts of a system with a self-excited generator.
Figure 5:
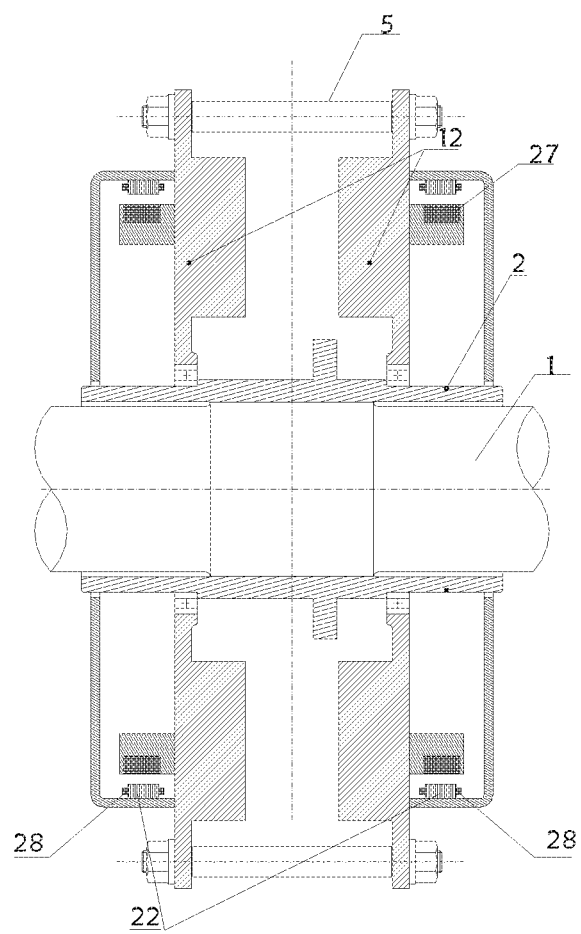
FIG. 5: Non-moving parts of a system with a self-excited generator.
Figure 6:
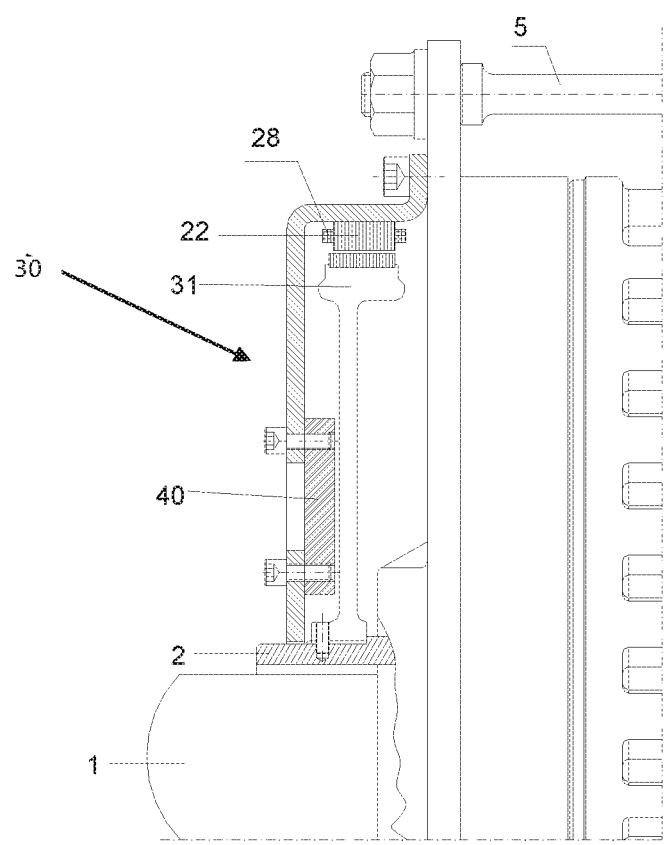
FIG. 6: Detailed view of the permanent-magnet generator.
Figure 7:
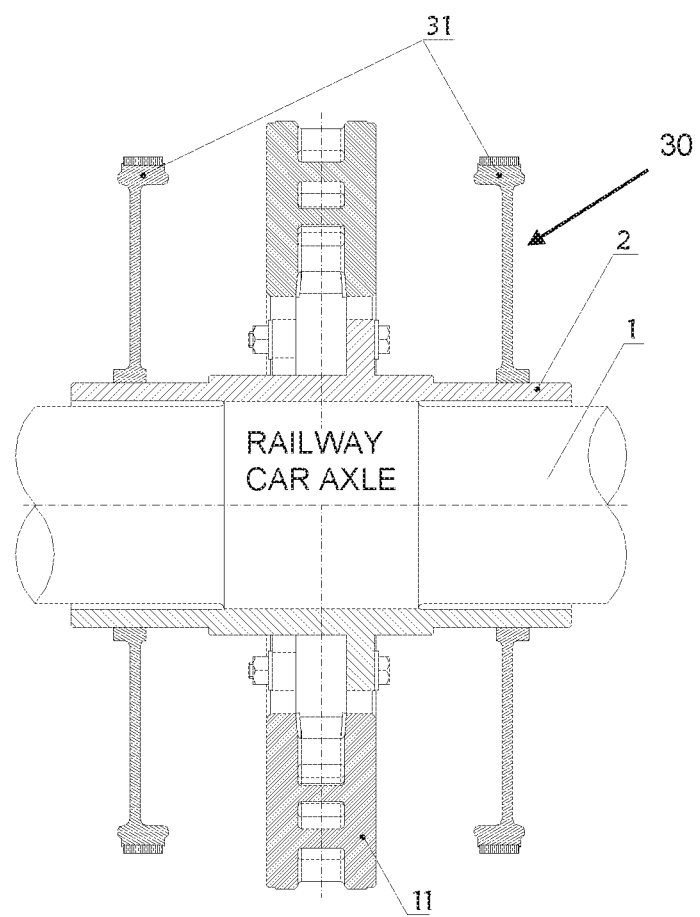
FIG. 7: Moving parts of a system with a permanent-magnet generator.
Figure 8:
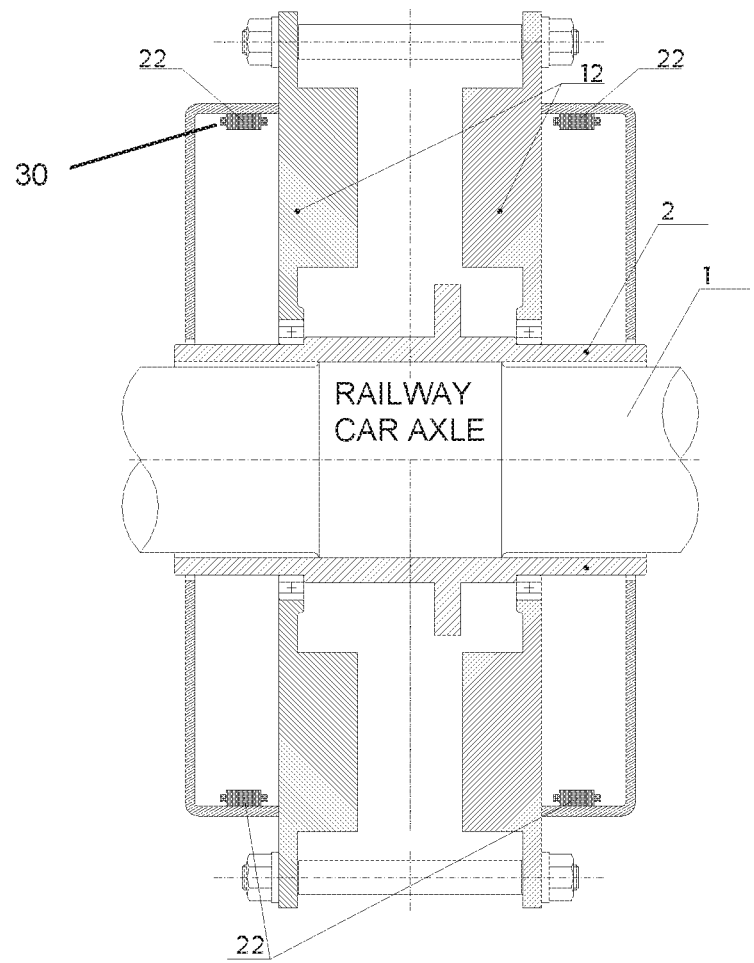
FIG. 8: Non-moving parts of a system with a permanent-magnet generator.

The following figures complement FIG. 2, showing the two types of generators separately and in greater detail. The self-excited generator 20 is illustrated in FIGS. 3, 4, and 5. The permanent-magnet generator 30 is illustrated in FIGS. 6, 7, and 8.

As shown in the figure, the retarder 10 is positioned centrally, and the generators 20, 30 are coupled to the outside of the retarder 10. The rotating elements: the retarder rotor 11 and the rotors 21 (or 31) of the generator 20 (or 30) are fixed to a bushing 2, forming a monobloc assembly. The rest of the non-rotating elements of the retarder 10 and the generators 20, 30 are mounted using bearings 4.

Preferably, the retarder 10 rotor 11 will be a cast steel assembly. The rotor 11 may be manufactured as two disks 13 connected by a series of ribs 14, which are generally cylindrical. High electrical conductivity is required in the rotor to ensure that the absorbed power is greater for the same electromotive force, thus increasing the induced current. Also, high thermal conductivity facilitates the dissipation of the heat that is generated. Another important factor that promotes heat dissipation is the optimization of the design. To do this, the geometry of the ribs 14 will preferably be such that it is able to ventilate the inside of the rotor 11 with air, regardless of the direction of rotation of the rotor 11, thus facilitating heat dissipation.

When this assembly is installed on a railroad car axle, it is rigidly affixed to it, generally as a forced joint (pressed) as is done with conventional brakes. In other applications, the retarder 10 may incorporate its own axle.

The stators of the retarder 10 and generator 20, 30 will preferably be made of a ferrous alloy. The electromagnets 15 are fixed inside the retarder 10 stator 12, while the stator 22 of the generator 20, 30, with its cores and winding 28, is attached to the outside. The stator 22 is similar for the two types of generators (self-excited 20 and permanent-magnet 30).

An exterior ring with bearings suitable to withstand the weight of the retarder, as well as the axial and radial forces that produce vibration, may be used to mount it on the axle 1. To regulate the axial clearance of the bearings 4 of the stators 12, they have been designed with a series of braces 5 and nuts that set the air gap distances.

Also, a series of supports secure the stators 12 to a frame or chassis to prevent them from turning with the axis 1.

The generator 20 is self-excited by the winding 27 of the fixed pole core 26, secured to the outside of the retarder 10 stator 12 (or stators, if two generators are needed on each side). The remanence on this pole core 26 must be large enough to make pre-excitation unnecessary (it is made of hard magnetic materials).

The rotor 21 of the generator 20 is preferably mounted securely to the bushing 2 and has an interior configuration with a solid core. The fixed pole core 26 is included inside, and is frictionless, which is to say that the preliminary air gaps are maintained.

The stator 22 of the generator 20 is properly secured to the outside of the stator 12 (or stators) of the retarder 10, on the same side as the fixed pole core 26. This stator 22 is made up of sheets that are insulated from one another, equipped with a series of slits, which are tightly compressed to form a compact core. The stator windings 28 are installed in the aforementioned slits.

The field magnetizes the disks 13 of the rotor 11, alternating N-S, when they turn, inducing an alternating current on the stator 22 winding 28 of the generator 20.

The other type of generator shown in FIG. 6 to FIG. 8 is a permanent-magnet generator 30. The source of electrical energy is achieved by means of a rotor 31 with permanent magnets that are fixed to the bushing 2, with the generator 30 stator 22 secured to the outside of the retarder 10 stator 12.

Both types of generators 20, 30 are properly sized to supply the necessary power to the retarder 10, which is responsible for braking above a certain speed threshold. At slower speeds, the conventional mechanical brake must be applied until the vehicle comes to a complete stop. These two generators 20, 30 may act individually or jointly on the retarder 10, functioning independently.

The rotors or inducers 21, 31 of the generators 20, 30 generate the magnetic field necessary for the windings of the stators 22 of the generators to generate the corresponding alternating current.

The retarder 10 functions with no wear or friction, and the bearings 4 are the only parts that are subject to wear. Alloys are preferably used in their manufacture, combining those that are magnetic and non-magnetic, in order to make better use of flows and prevent them from dispersing. Welds should preferably be avoided, bolting the elements and sub-assemblies precisely and securely, based on the thermal fatigue stresses to which they are subjected.

A braking regulator module 40 will be responsible for controlling the braking force. The braking regulator module 40 is an electronic control device that converts and controls the current from the power supply for use directly on the windings of the retarder 10, based on the parameters programmed according to the required operating conditions.

This regulator module 40 modifies the power supply of the retarder 10 linearly, allowing more or less power supply voltage to enter the retarder 10 in a linear manner, which provides precise control over braking. The braking regulator 40 generally includes a rectifier and a voltage stabilizer. The generator 20, 30 produces alternating current, transforming the mechanical energy of the rotation produced by the axle 1 into electrical energy to power the retarder 10. Since this is alternating current, it must be rectified for correct functioning and control of the retarder 10. The rectifier converts the alternating current into direct current. It also includes a voltage stabilizer to keep it approximately constant, without variations when rpm (revolutions per minute) increase or decrease.

Part of the braking regulator module 40 is located next to the retarder 10, but the control will preferably be located in another place. For example, in railway vehicles, it is generally located inside the train's cab to be manipulated by the operator and to control or monitor the braking force of all of the cars.

The control input that the regulator module 40 receives is the desired braking signal from the central computer system, which may be manual or automatic. It also receives the actual rotation speed detection signals and the digital input-output signals, to receive information or safety conditions from the vehicle's central system, and also to send these signals to the vehicle's central system.

The regulator module 40 is preferably programmable for different operating limit curves, for example, direct or inverse signal, or linear or quadratic response. A fully autonomous power supply is achieved by generating current using the integrated generator 20, 30. The regulator module 40 controls and sends the excitation current from the generator in the form of a closed servo control loop, to obtain braking current based on the control signal and within the limits of the previously programmed curves.

In addition, for greater safety, a temperature sensor installed on the brake can be used in any of the embodiments described to limit the maximum power levels that are developed.

Figure 9:
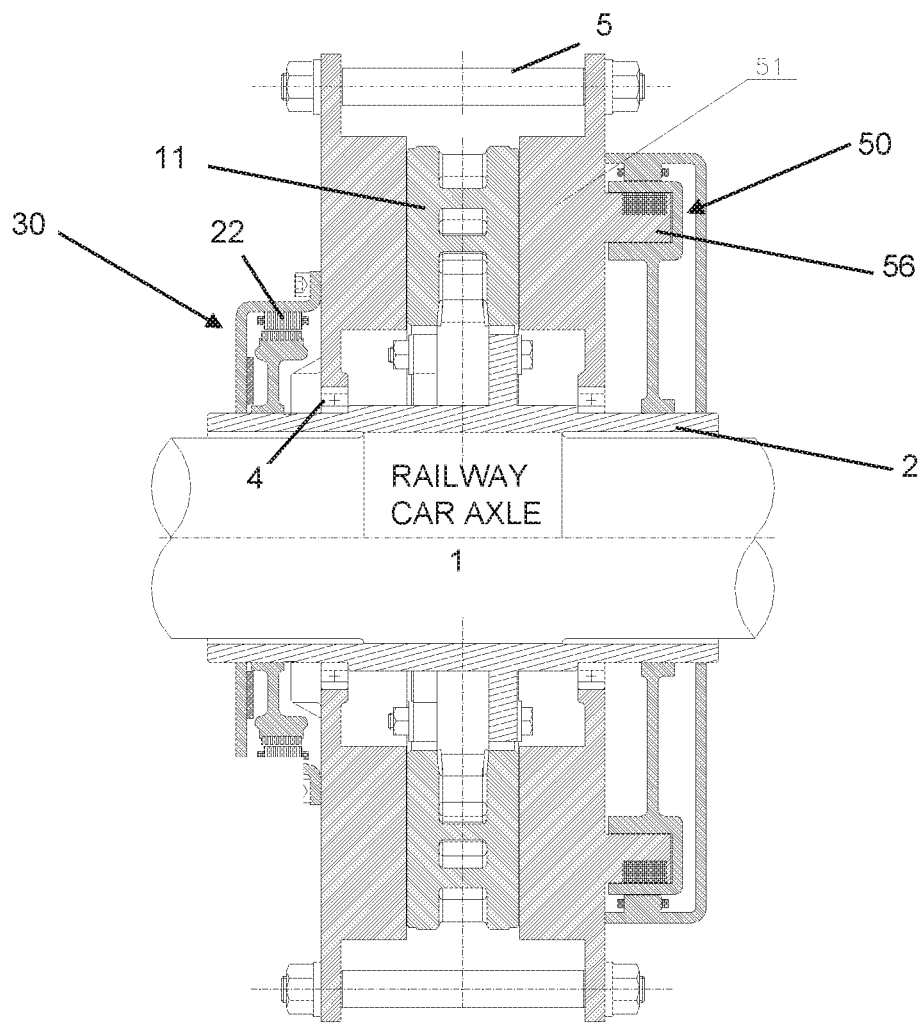
FIG. 9: Detailed view of the system with two combination generators, one auxiliary generator that excites another principal generator.
Figure 10:
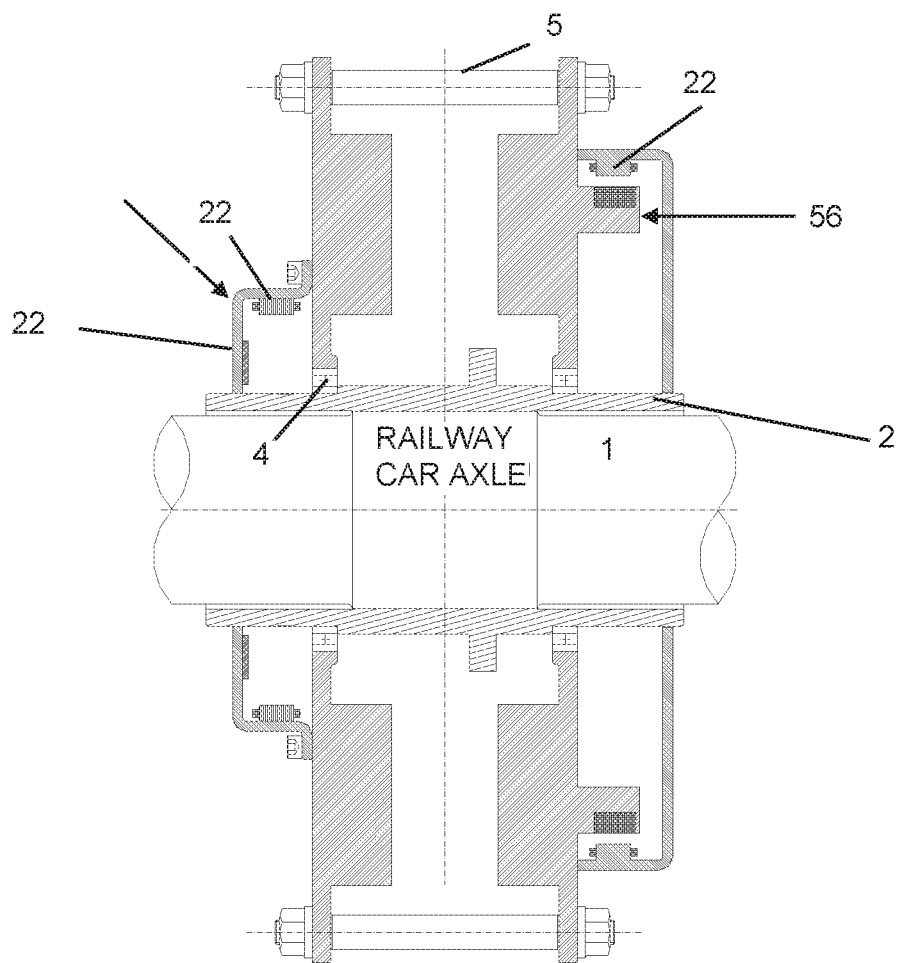
FIG. 10: Non-moving parts of FIG. 9.
Figure 11:
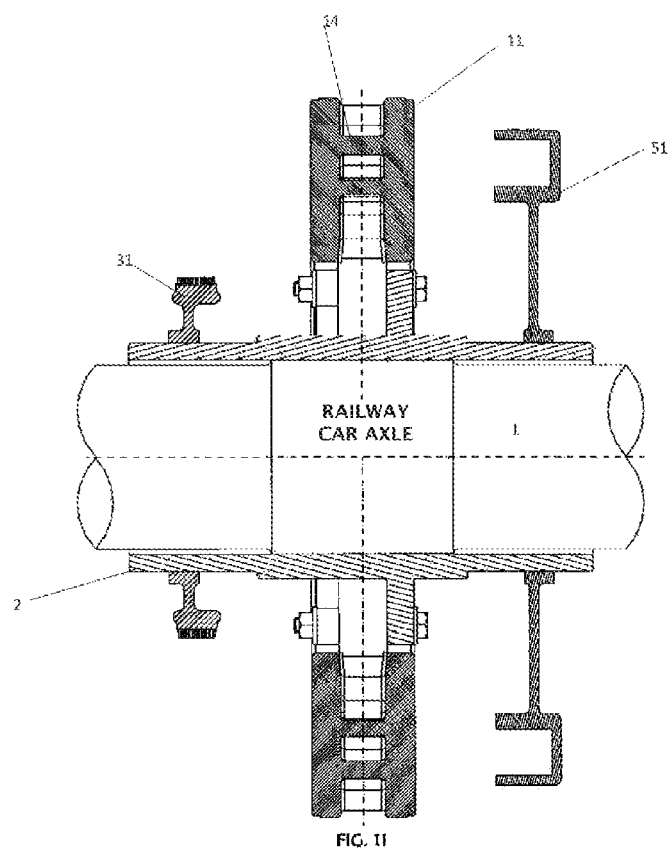
FIG. 11: Moving parts of FIG. 9.

Finally, another specific embodiment that uses a generator with higher output is described. If the hard materials in a self-excited generator are replaced with soft materials (core 56), the generator may no longer be self-excited, but in exchange generates much greater output. This type of generator will be referred to hereinafter as an "external-excitation generator 50". FIG. 9 to FIG. 11 show a retarder system that is equipped with this generator 50 as the principal generator, along with a permanent-magnet generator 30 as an auxiliary. Preferably, the core 56 (low remanence) has the same composition as the ferrous parts of the stator 12.

The self-excitation is due to the fact that hard materials, once magnetized, behave like permanent magnets. Consequently, soft materials are easily demagnetized and their losses are lower, so they may be preferable in applications with higher output (they have lower hysteresis losses than hard materials, so they do not heat up as much and output is higher).

In this case, the excitation to create the magnetic field needed in the generator 50 must be provided externally to start up. Specifically, this can be done advantageously through a small auxiliary permanent-magnet generator 30. This allows the generator 50 that is acting as the main generator to be optimized as much as possible. In other words, once the rotor 51 reaches an adequate speed, it is no longer excited by the generator 30, which will be deactivated.

This mixed or hybrid configuration is also especially desirable in a situation in which the retarder 10 has a low number of revolutions. It is then that the braking torque, and consequently the power supply to the retarder, must be the highest. For this reason, soft materials must be used in the fixed pole core as well as in the pole masses. The use of soft materials results in high levels of magnetic saturation, and also eliminates the passive resistance to rotation when there is no excitation, reducing inertia to insignificant levels.

The control of external excitation in a mixed configuration is provided by an electronic system that can be integrated into the regulator module 40, which controls the power that is supplied by the auxiliary generator (permanent-magnet generator 30) to the induction winding of the retarder generator. This is fixed to the axle and rotates, so the electronic system is responsible for ensuring that the auxiliary generator sends an excitation supply with the highest power when the axle is rotating at lower rpm. And in the opposite case, when the axle is rotating at high rpm, the system will limit the excitation power supply of the induction winding of the retarder generator, because it requires less excitation voltage when it is rotating at high rpm.

Glossary of Numerical References

1 Axle.
2 Bushing.
3 Housings.
4 Bearings.
5 Braces.
10 Retarder.
11 Central rotor of the retarder 10.
12 Stator of the retarder 10.
13 Disks.
14 Ribs.
15 Electromagnets.
20 Self-excited generator.
21 Rotor of the self-excited generator 20.
22 Stator of the generator (either self-excited 20, with permanent magnets 30, or external excitation 50).
26 Stationary hard core (with high remanence).
27 Core winding.
28 Windings (of stators of generators 20, 30, 50).
30 Permanent-magnet generator.
31 Rotor of the permanent-magnet generator 30.
40 Regulator module.
50 External-excitation generator.
51 Rotor of the external-excitation generator. 56 Stationary soft core (or low remanence).

The invention claimed is:

1. An autonomous retarder system for a vehicle that comprises:
   a retarder comprising:
      a central rotor rigidly coupled to an axle, the central rotor having a first side and a second side, the second side being opposite the first side;
      a first stator disposed on the first side of the central rotor, the first stator having a first internal side proximate the central rotor and a first external side opposite the first internal side; and
      a second stator disposed on the second side of the central rotor, the second stator having a second internal side proximate the central rotor and a second external side opposite the second internal side;
      a first electromagnet couple attached to the first internal side of the first stator;
      a second electromagnet couple attached to the second internal side of the second stator;
   a first generator secured to the first external side of the first stator of the retarder, the first generator comprising a permanent-magnet generator adapted to supply electrical energy, the first generator further comprising a first generator stator attached to the first external side of the first stator of the retarder, and a first generator rotor different from the central rotor, the first generator rotor disposed on the first external side of the first stator of the retarder, wherein the first generator rotor is rigidly coupled to the axle; and
   a second generator secured to the second external side of the second stator of the retarder, the second generator comprising a second generator stator attached to the second external side of the second stator of the retarder, and a winding self-excited generator adapted to supply electrical energy, the second generator further comprising a second generator rotor different from the central rotor and different from the first generator rotor, the second generator rotor disposed on the second external side of the second stator of the retarder, wherein the second generator rotor is rigidly coupled to the axle;
   wherein:
      the first generator and the second generator cooperate such that the first generator supplies electrical energy to the retarder when a rotational speed of the axle is lower than a first threshold and the second generator supplies electrical energy to the retarder when the rotational speed of the axle is higher than a second threshold.

2. The autonomous retarder system according to claim 1, wherein the central rotor is self-ventilated.

3. The autonomous retarder system according to claim 2, wherein the central rotor of the retarder comprises two lateral disks and a plurality of spaced ribs connecting said lateral disks.

4. The autonomous retarder system according to claim 1, further comprising a braking regulation module configured to control an excitation current of at least one of the first and second generators according to a control signal.

5. The autonomous retarder system according to claim 4, wherein the braking regulation module comprises a rectifier and a voltage stabilizer.

6. The autonomous retarder system according to claim 4, further comprising a temperature sensor adapted to measure a temperature of the retarder and communicate with the braking regulation module to reduce a current from the generator if the temperature exceeds a threshold.

7. A vehicle that incorporates the autonomous retarder system according to claim 1.

8. The autonomous retarder system of claim 1, wherein:
   the first generator includes a first generator stator; and
   the second generator includes a second generator stator.

9. An autonomous retarder system for a vehicle that comprises:
   a retarder comprising:
      a central rotor rigidly coupled to an axle, the central rotor having a first side and a second side, the second side being opposite the first side;
      a first stator disposed on the first side of the central rotor, the first stator having a first internal side proximate the central rotor and a first external side opposite the first internal side, wherein the first stator is rigidly coupled to the axle; and
      a second stator disposed on the second side of the central rotor, the second stator having a second internal side proximate the central rotor and a second external side opposite the second internal side, wherein the second stator is rigidly coupled to the axle;
   a first generator secured to the first external side of the first stator of the retarder, the first generator comprising a permanent-magnet generator adapted to supply electrical energy the first generator further comprising a first generator rotor different from the central rotor, the first generator rotor disposed on the first external side of the first stator of the retarder; and
   a second generator secured to the second external side of the second stator of the retarder, the second generator comprising an external-excitation generator adapted to supply electrical energy, the second generator further comprising a second generator rotor different from the central rotor and different from the first generator rotor, the second generator rotor disposed on the second external side of the second stator of the retarder;
   wherein:
      the first generator and the second generator cooperate such that the first generator supplies electrical energy to the retarder when a rotational speed of the axle is lower than a first threshold and the second generator supplies electrical energy to the retarder when the rotational speed of the axle is higher than a second threshold.

10. The autonomous retarder system according to claim 9, wherein the first generator is further configured to provide excitation to the second generator.

* * * * *